(No Model.) 6 Sheets—Sheet 1.
L. V. BENÉT & H. A. MERCIÉ.
BREECH MECHANISM FOR GUNS.

No. 538,227. Patented Apr. 30, 1895.

Fig. 1.

Witnesses,

Inventors,
Laurence V. Benét
Henri A. Mercié
by Woodbury Lowery
Their Atty.

(No Model.) 6 Sheets—Sheet 2.

L. V. BENÉT & H. A. MERCIÉ.
BREECH MECHANISM FOR GUNS.

No. 538,227. Patented Apr. 30, 1895.

(No Model.) 6 Sheets—Sheet 4.

L. V. BENÉT & H. A. MERCIÉ.
BREECH MECHANISM FOR GUNS.

No. 538,227. Patented Apr. 30, 1895.

Witnesses.

Inventors,
Laurence V. Benét
Henri A. Mercié
by Woodbury Lowery
Their Atty

(No Model.) 6 Sheets—Sheet 5.

L. V. BENÉT & H. A. MERCIÉ.
BREECH MECHANISM FOR GUNS.

No. 538,227. Patented Apr. 30, 1895.

Witnesses,

Inventors,
Laurence V. Benét
Henri A. Mercié
by Woodbury Lowery
Their Atty.

(No Model.) 6 Sheets—Sheet 6.

L. V. BENÉT & H. A. MERCIÉ.
BREECH MECHANISM FOR GUNS.

No. 538,227. Patented Apr. 30, 1895.

UNITED STATES PATENT OFFICE.

LAURENCE V. BENÉT AND HENRI A. MERCIÉ, OF PARIS, FRANCE, ASSIGNORS TO THE HOTCHKISS ORDNANCE COMPANY, LIMITED, OF LONDON, ENGLAND.

BREECH MECHANISM FOR GUNS.

SPECIFICATION forming part of Letters Patent No. 538,227, dated April 30, 1895.

Application filed September 25, 1894. Serial No. 524,099. (No model.)

*To all whom it may concern:*

Be it known that we, LAURENCE V. BENÉT, a citizen of the United States, and HENRI A. MERCIÉ, a citizen of the Republic of France, both residing at Paris, France, have invented new and useful Improvements in Breech-Operating Mechanism for Breech-Loading Guns, of which the following is a specification.

Our invention relates to that class of guns wherein the powder charge and primer are contained in, and the obturation performed by a metallic cartridge case, and particularly to that class of gun wherein its breech is opened and closed by a horizontal movement of the wedge or breech block.

The object of our invention is to furnish an improved percussion mechanism for this class of gun with improved means for cocking, maintaining, and releasing the firing pin, improved means for assembling and dismounting the mechanism and improved methods of preventing the discharge of the gun before the breech block is fully closed and locked.

In the accompanying drawings, which illustrate our invention, Fig. 12 is an elevation, and Fig. 13 is a plan view, of the locking screw and cocking cam. Fig. 14 is a section of the same on the line 14 14 of Fig. 12; and Fig. 15 is an elevation of the outer end of the locking screw. Fig. 16 is an elevation, and Fig. 17 a plan, of the working handle and shaft. Fig. 18 is a plan, and Fig. 19 a rear elevation, of the hammer; and Fig. 20 is a plan of the firing pin. Fig. 21 is a plan, and Fig. 22 a section, of the spring box on the line 22 22 of Fig. 21. Fig. 23 is a plan of the trigger shaft and spring; Fig. 24, an elevation of its outer end, and Fig. 25 a section of the same on the line 25 25 of Fig. 23. Fig. 26 is a plan view of the lanyard hook.

In all of the figures like letters designate like parts.

For the sake of illustration we have shown our mechanism applied to the breech block of the well known Hotchkiss mountain gun, and in connection with the breech block is indicated the well known Hotchkiss extractor and stop bolt. We shall first describe our mechanism in detail and finally describe its action as a whole.

In the drawings the gun body is shown as a single forging, comprising in one piece the barrel and the enlarged breech for the reception of the breech mechanism. It is obvious however that the breech may be formed in a separate jacket shrunk or otherwise attached to the tube or barrel of the gun.

Figure 1:
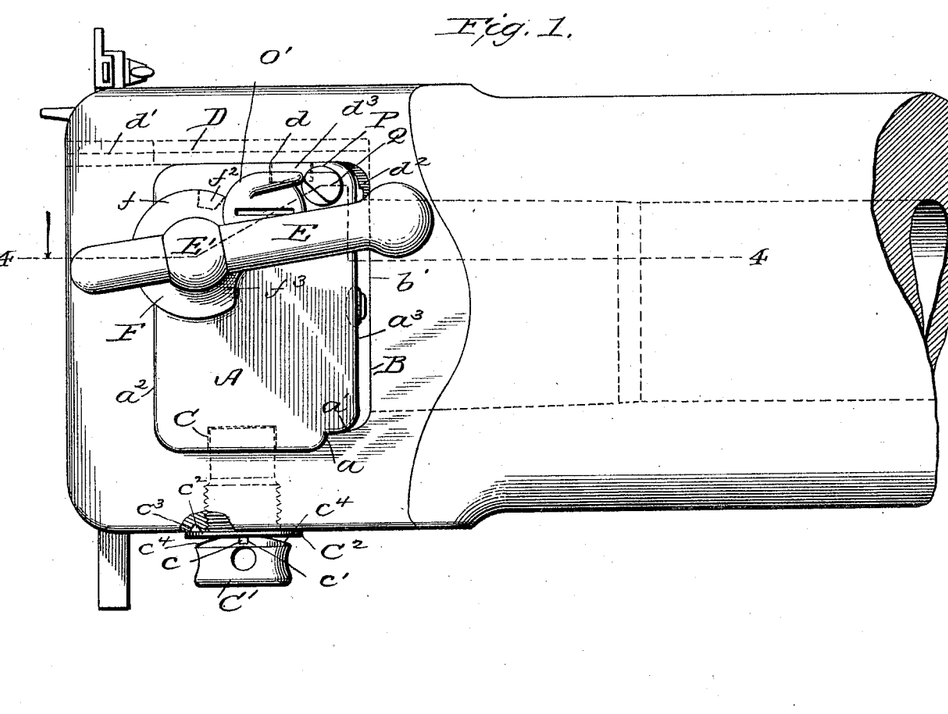
Figure 1 is a side elevation of the breech of the gun, with the breech closed and its hammer cocked and ready for firing.
Figure 9:
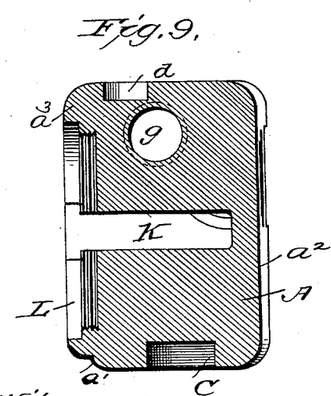
Fig. 9 is a section of the breech block on the line 9 9 of Fig. 7.

A is the breech block located in a horizontal mortise B in the gun breech and having a horizontal movement, which is controlled in the following way: In the bottom of the breech mortise is formed the projecting guide $a$ Fig. 1 which enters and registers with the corresponding recess $a'$ in the bottom face of the breech block Figs. 1, 6 and 9, thus guiding the breech block in its horizontal movement. This recess $a'$ is inclined to the axis of the gun at such an angle (Fig. 6) that as the breech block is withdrawn it is pushed a certain distance to the rear, thus carrying the front face of the breech block away from its forward abutment face in the breech mortise and the entrance to the bore of the gun. To permit of this movement the rear face $a^2$ of the breech block and the rear face $b$ of the mortise in the gun breech are inclined at an angle parallel with the breech block recess $a'$ while the front face $a^3$ of the breech block, the front face $b'$ of the gun-breech mortise and the mortise guide $a$ are substantially perpendicular to the axis of the gun. The inner end of the front face $a^3$ of the breech block is inclined rearwardly at $a^4$ (Figs. 3 and 7) in order to pass over the projecting head of the cartridge, and to drive the cartridge fully into the bore of the gun, as the breech block is being inserted.

To limit the extent to which the breech block A can be withdrawn, the under face of the breech block is formed with a groove C (Fig. 6) which is parallel to the inclined rear face $a^2$ of the breech block. Through the under side of the breech is screwed a stout bolt C' Figs. 1 and 2 the extremity of which projects into the mortise through the breech and engages in the groove C thus limiting the horizontal motion of the breech piece when withdrawn. To prevent the accidental unscrewing of the bolt C', a spring washer $C^2$ is interposed between the head of the bolt and the under surface of the breech of the gun. On the under surface of the washer are formed lugs $c$ which engage in corresponding recesses $c'$ in the upper face of the bolt head, and cause the washer to turn with the bolt. On the upper surface of the washer are rounded lugs $c^2$ which engage in corresponding rounded recesses $c^3$ in the lower surface of the breech of the gun. The bolt head C' is cut away at $c^4$ under the lugs $c^2$ in such manner that if sufficient force be exerted to turn the bolt, the washer will be able to spring back permitting the lugs $c^2$ to ride out of their recesses, thus allowing the bolt to be readily unscrewed.

Figure 2:
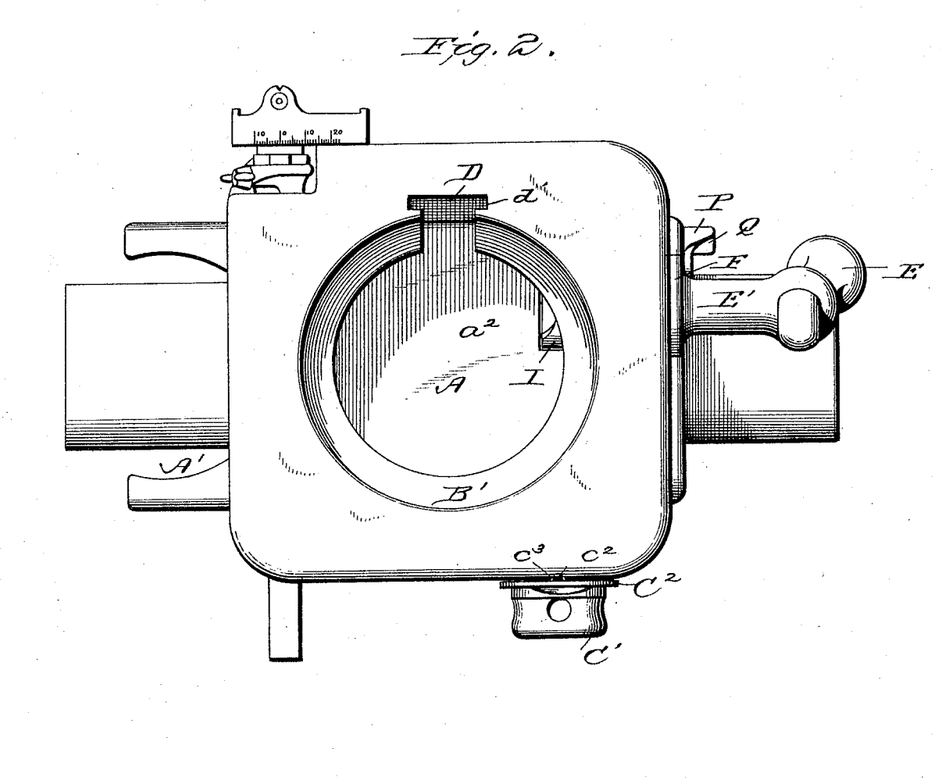
Fig. 2 is the corresponding rear elevation of the breech of the gun.
Figure 3:
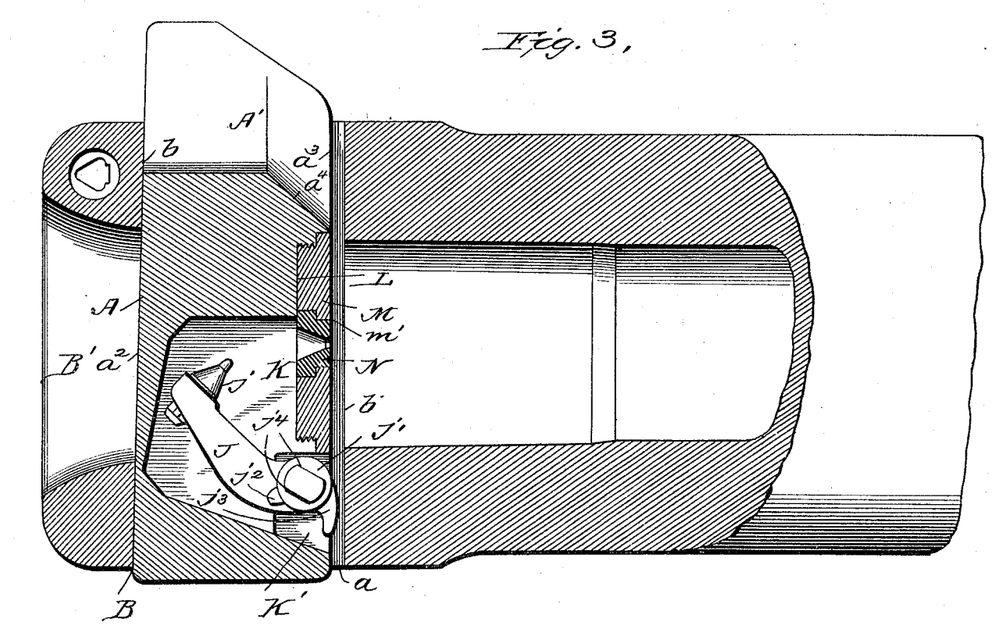
Fig. 3 is a horizontal section through the axis of the gun, showing the hammer in full.
Figures 6, 7:
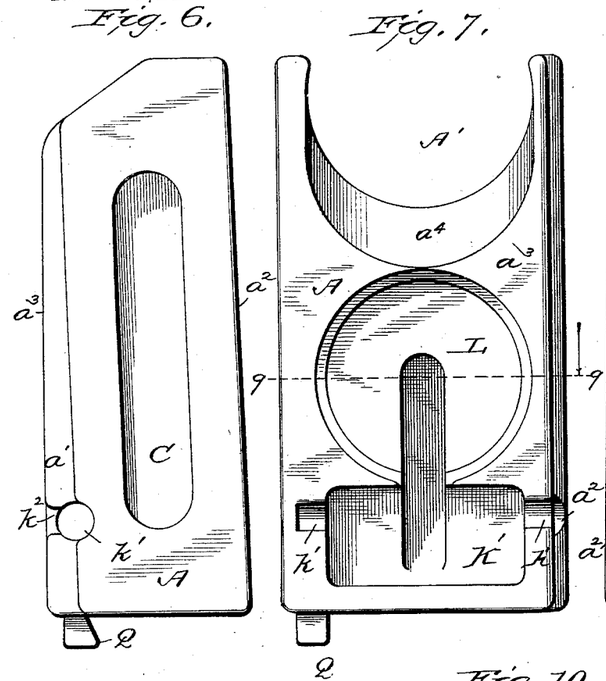
Fig. 6 is a bottom view of the breech block.
Fig. 7 is a front view of the same with firing plate and hammer removed.

A' Figs. 2, 3, and 7 is a circular aperture in the end of the breech block, which registers with the bore of the gun and the enlarged aperture B' in the breech, to permit the insertion of the cartridges, when the breech block has been withdrawn to the full extent permitted by the bolt C' and groove C.

Figure 8:
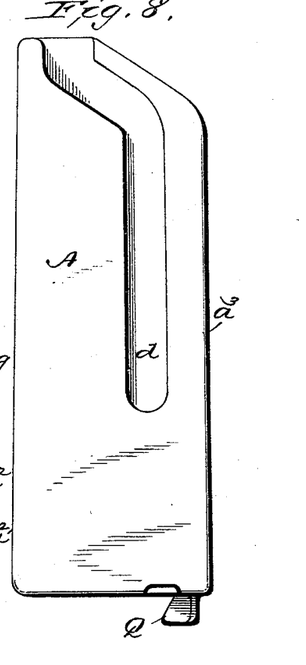
Fig. 8 is a top view of the same.

The extractor D (Fig. 1) of a well known construction consists of a single piece of metal, which is lodged in a T shaped mortise $d'$ (Fig. 2) formed in the breech of the gun. Its front end is provided with a claw $d^2$ (Fig. 1) for grasping the head of the cartridge, and a stud $d^3$ formed on its lower surface which engages the groove $d$ (Fig. 8) formed in the upper surface of the breech block parallel to the front face of the breech block for a certain distance, and then inclined abruptly to the rear. As the breech block is withdrawn the stud engaging the groove $d$ causes the extractor D to follow the rearward motion of the breech block, thus starting the cartridge from the chamber of the gun. When the breech block is so far withdrawn as to nearly bring the openings A' and B' in line, the stud of the extractor striking the abruptly inclined portion of the groove $d$ is caused to move sharply to the rear, ejecting the fired cartridge case from the gun.

Figures 4, 5:
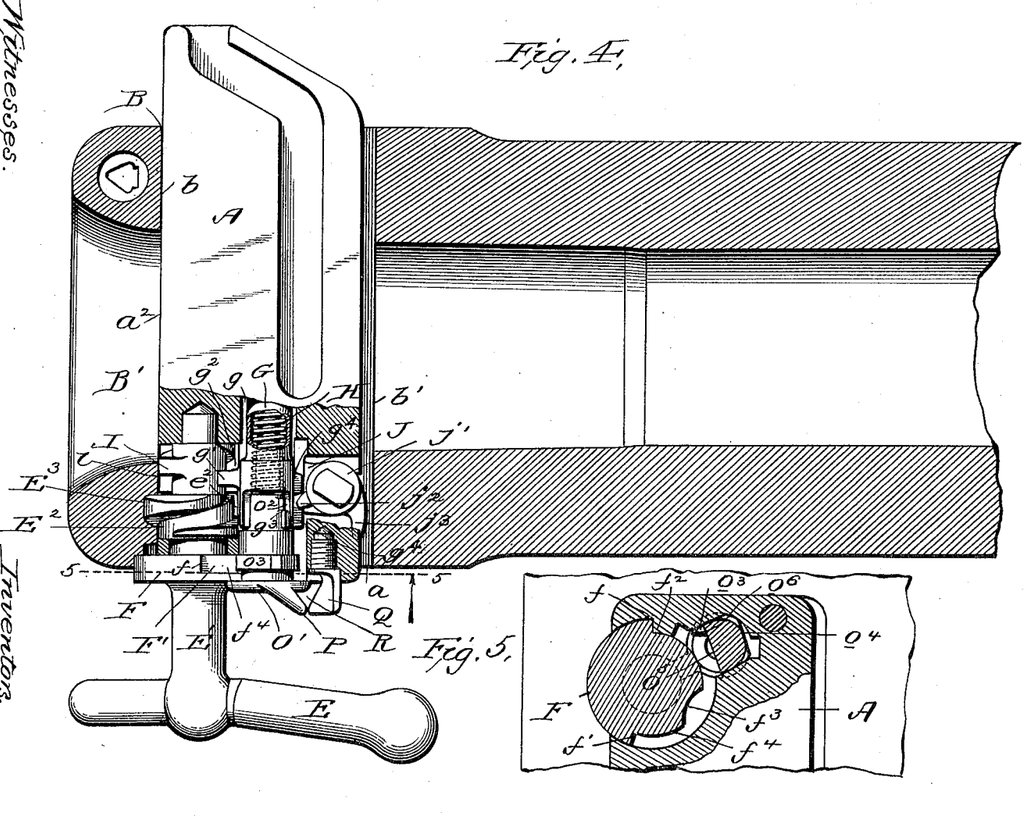
Fig. 4 is a section along the line 4 4 of Fig. 1.
Fig. 5 is a section on the line 5 5 of Fig. 4.
Figures 12, 13, 14, 15, 16, 17:
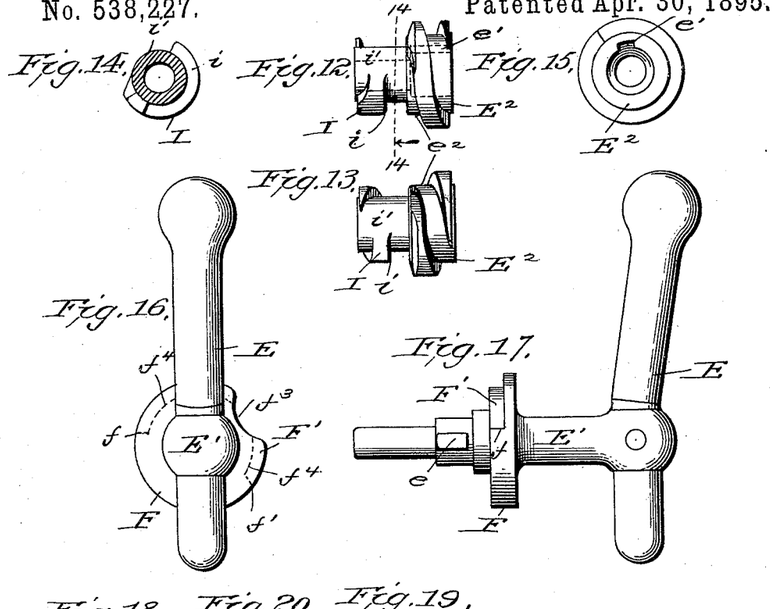

The breech block is withdrawn by means of the handle E (Figs. 1, 2, 4, 16, and 17) mounted on a shaft E' journaled in the breech block, and sensibly perpendicular to the vertical plane of the gun. On the shaft E' is formed a key or spline $e$ which engages in a keyway $e'$ cut in the locking screw $E^2$ (Figs. 4, 12 and 15). The locking screw $E^2$ is formed in one piece with the cocking cam I hereinafter described. The locking screw $E^2$ is preferably cut as shown in Figs. 12 and 13 with a thread of rectangular section, and engages in a partial female screw $E^3$ (Fig. 4) cut in the rear face of the breech mortise. When the locking screw is home, the breech is locked, and the firing mechanism substantially in line with the axis of the bore. The thread of the locking screw makes but one revolution around its axis and terminates at $e^2$ Figs. 12 and 13 so that when the handle E and with it the locking screw $E^2$ is given a half turn to the rear, its thread is disengaged from the female thread in the breech of the gun, and the breech block is then free or no longer locked and may be withdrawn.

On the shaft E' is formed a disk F on the inner side of which is cut a recess F' limited at each end by the two abutment surfaces $f f'$. In this recess engages a projection or stop $f^2$, which is formed in a recess in the breech block, wherein the disk is lodged and may freely revolve. The abutment surfaces $f$ and $f'$ are at such a distance apart that they strike the stop $f^2$ according as the locking screw is fully home, or given a half turn to the rear to withdraw the breech block; that is to say, the abutment surfaces $f$ and $f'$ with the stop $f^2$ operate to limit the rotary motion of the handle E together with the shaft E' and the locking screw $E^2$. The shaft E' is held in place, and the force applied to the handle E for withdrawing the breech block is resisted, by the shoulder $o$ of the trigger shaft O' as hereinafter described and the shaft $E^2$ cannot be removed from the breech block without first removing the trigger shaft.

To automatically cock the hammer on closing and locking the breech we provide the following mechanism; a trigger shaft O (Figs. 4 and 23) hereinafter more fully described, is inclosed in a spring box G (Fig. 21) capable of a limited longitudinal play on the trigger shaft as an axis. Around the shaft O within the box is coiled the main spring H having one end abutting against the shoulder $o'$ of the trigger and the other against the bottom of the spring box. The spring box G and the trigger O are located in a longitudinal cylindrical chamber $g$ (Figs. 4 and 9) formed in the breech block in which the trigger O is stationary in respect to longitudinal motion. On one side of the spring box is formed the cocking toe or lug $g'$ which projecting through a longitudinal slot $g^2$ in the wall of the chamber $g$ parallel with the axis of the chamber, engages with the cocking cam I. The cocking cam I (Figs. 4, 12 and 13) is formed in one piece with the locking screw $E^2$ and partakes of its rotary motion when the handle E is turned to the front or to the rear. The surface of the cocking cam has a helical thread $i$ extending upward from its tip, and making part of a complete revolution around its axis, so as to leave a plain surface $i'$ extending along the axis unoccupied by a thread or any obstruction. See Fig. 12. When the breech is locked, and when the spring box G is pressed inward by the main spring H the cocking toe $g'$ rests against the tip end of the helical thread $i$ of the cocking cam. On turning the handle E to the rear to unlock the breech block the cocking cam I partakes of the rotary motion and the helical thread causes the cocking toe $g'$ and with it the spring box G to move longitudinally outward on the trigger shaft thus compressing the main spring H between the bottom of the box against which it abuts and the shoulder $o'$ of the trigger shaft. The spring box G is prevented from turning about its axis by the cocking toe, in the slot $g^2$. Just before the handle E has reached its extreme position, that is, just before the surface $f$ has struck the stop $f^2$, the plane surface $i'$ of the cocking cam passes over the cocking toe holding it positively to the rear.

Figures 18, 19, 20, 21, 22, 23, 24, 25, 26:
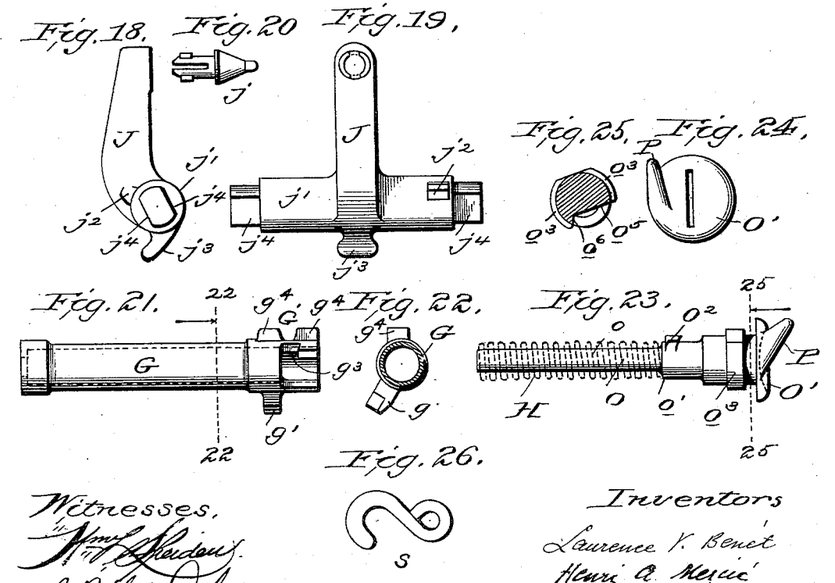

The hammer J (Figs. 3, 4, 18, and 19) consists of a single piece of metal, provided with a detachable or permanent firing pin $j$ (Fig. 20), and is located in a slot or mortise K (Figs. 3, 7, and 9) in the axis of the breech block which permits it to rock within certain limits, while a further mortise K' at right angles to the mortise K affords space for its shaft $j'$. On the shaft $j'$ is formed the tooth $j^2$, one or more, which engages between the two or more teeth $g^4$ $g^4$ of the cocking rack G' formed on the spring box G, (Figs. 4 and 19.) As the shaft of the hammer is free to revolve in journals, it is evident that it will revolve to the rear or to the front according as the spring box moves outwardly or inwardly under the action of the cocking cam upon the cocking toe. On one side of the shaft or axis of the hammer is formed a lug or tail $j^3$, to facilitate the removal of the hammer when dismounting the mechanism. The extremities of the shaft of the hammer (Figs. 18 and 19) are reduced in diameter, and journal in bearings $k'$ (Fig. 7) formed in the upper and lower faces of the mortise K' in the breech block. These holes $k'$ are cut away toward the front face of the breech block, forming channels $k^2$ through which the axis of the hammer may be slipped into place. As shown the extremities of the axis of the hammer are cut away at $j^4$ in order that when turned to a given position they may pass through the channels $k^2$ into their bearings $k'$. This position is determined in such manner that the hammer can only be slipped into place and the tooth $j^2$ register with the cocking rack, when the spring box G has been withdrawn a greater distance than it moves under the influence of the cocking cam I. Hence to dismount or mount the hammer it is necessary first to remove the mainspring, when the spring box may be sufficiently withdrawn to permit the extremities of the shaft or axis of the hammer to engage in and move along the channels $k^2$.

Figure 10:
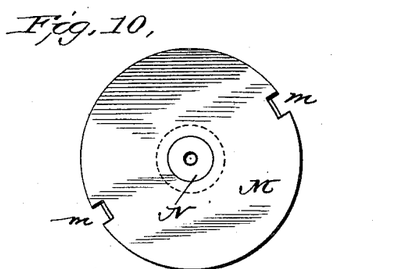
Fig. 10 is a front face, and Fig. 11 a section, of the firing plate.
Figure 11:
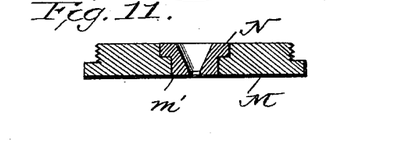

In the front face of the breech block in front of the mortise K in which the hammer rocks, is a recessed seat L in which is seated a firing plate M (Figs. 3, 10, and 11) removably secured in place by a screw thread formed around it which registers with a corresponding thread formed in the firing plate seat L. Two or more recesses $m\,m$ (Fig. 10) in the firing plate M are provided, by which the plate may be removed with a wrench. In the axis of the firing plate M is formed a shouldered or stepped aperture $m'$ which registers with the primer and with the firing pin of the hammer when the latter is in the forward position. Into this aperture is forced a hardened and removable bushing N, wherein is formed a passage for the firing pin (Fig. 3). When this passage has become corroded through the leakage of defective primers, it may be replaced with a new bushing, thus obviating the necessity of renewing the firing plate as a whole.

The trigger shaft O (Figs. 23, 24, and 25) consists of a single piece of metal and performs the functions of trigger, sear, support of main spring and lock for mechanism. Beginning at the inner end we find the shaft O on which is placed the main spring H, which abuts against the shoulder $o'$. Near this shoulder is the projecting sear $o^2$, which can engage in the cocking notch $g^3$ formed in the walls of the spring box G. In Fig. 4 the sear is shown engaged with the cocking notch, and it is clear that if the trigger shaft be turned to the rear about its longitudinal axis the sear will leave the notch permitting the spring box to fly forward causing in its turn the hammer to strike and explode the primer of the cartridge.

To the rear of the projecting sear $o^2$ of the trigger shaft is formed the annular shoulder $o^3$ which engages in the annular groove $o^4$ (Fig. 5) in the breech block. Both the shoulder $o^3$ and the metal covering the groove $o^4$ are cut away so as to form a bayonet joint, in such manner that the trigger shaft may be slipped into place and given a half turn, when it will be locked. In order that the annular shoulder $o^3$ may pass the disk F of the shaft of the handle E, a circular passage $f^3$ (Fig. 1) is formed in the disk, in such manner that the handle E being turned to an essentially vertical position, the passage $f^3$ registers with the cylindrical chamber $g$ which contains the spring box G and trigger shaft O. In this position the trigger shaft may be introduced into its place and when locked its head O' (Fig. 1) bearing against the disk F prevents the withdrawal of the handle E and its shaft E'. It is obvious that the trigger shaft cannot be unlocked and withdrawn except when the handle E is in the vertical position, as in any other position the face $o^5$ of the annular stop $o^3$ will strike the rear wall $f^4$ on the inner recess F' of the disk F.

The sear $o^2$ of the trigger shaft is made to engage with the cocking notch $g^3$ of the spring box G by means of the face $o^6$ of the annular shoulder $o^3$ as follows: When the handle E is turned to the rear to unlock the breech, the face $f'$ formed in the recess $F'$ of the disk F strikes the face $o^6$, just before it strikes the stop $f^2$ in the breech block, thus causing the trigger piece to revolve sufficiently to bring the sear $o^2$ in line and into engagement with the cocking notch $g^3$. Once the sear is engaged in the cocking notch and the handle E turned to the front, the spring box G will be entirely supported against the pressure of the main spring by the sear. If now the trigger shaft be turned to the rear disengaging the sear from the cocking notch, the spring box will fly inward under the impulse of the main spring causing the hammer to revolve and fire the gun. On the end of the trigger shaft is formed a projecting lug or trigger P which is eccentric to the axis of the trigger shaft. Formed on or attached to the breech block is a projecting hook Q, which when the gun is cocked abuts against the trigger P forming an eye or aperture R. To fire the gun an ordinary lanyard is provided to the end of which is attached a hook shaped piece S (Fig. 26) of metal. Introducing the lanyard hook into the eye R, a smart jerk on the lanyard will cause the trigger shaft to revolve freeing the sear from the cocking notch and firing the gun. At the same time the lanyard hook passes between the trigger P and the projecting hook R thus disengaging the lanyard from the gun. This disengaging arrangement is necessary in all mountain, field and siege guns having a great recoil, in order to prevent injury to the hand grasping the lanyard.

The action of the mechanism is as follows: The gun having been fired, the handle E is given a half turn to the rear. The locking screw $E^2$ revolving with the handle releases its thread from the female thread in the breech of the gun, thus unlocking the breech. The cocking cam I being in one piece with the locking screw revolves with it, and its helical thread $i$ drives the cocking toe $g'$ outward, drawing with it the spring box G which slides upon the trigger shaft O, and compresses the main spring H between the bottom of the box and the shoulder $o'$ of the trigger shaft. At the end of the motion the cocking notch $g^3$ has slightly passed the sear $o^2$. As the spring box G moves to the side, the inward tooth of the rack $G'$ acting against the tooth $j^2$ causes the hammer J to revolve to the cocked position. Just before the handle E and with it the disk F has completed its revolution, but after the spring box G has been fully retracted, the face $f'$ strikes the face $o^6$ causing the trigger shaft to revolve to the front bringing the sear $o^2$ in line with the cocking notch $g^3$ and the trigger P in contact with the hook Q. The breech may now be opened by pulling the handle smartly outward from the gun, until its lateral movement is arrested by the stop bolt $C'$. As the breech block is pulled outward it moves slightly to the rear following the guide $a$. As the block moves outward, the extractor following the parallel portion of the guide $d$ moves slowly away from the chamber of the gun thus starting the fired cartridge case with a powerful leverage. When the extractor stud strikes the abruptly inclined portion of the groove $d$, the extractor is caused to move violently to the rear throwing the empty cartridge case clear of the gun. The gun is now ready for loading, the new cartridge is passed into the chamber of the gun through the openings $B'$ $A'$, until its head or flange takes against the claw $d^2$ of the extractor. The breech of the gun is now closed by pushing the handle E smartly toward the breech of the gun. The inclined face $a^4$ of the breech block acting against the head of the cartridge causes the latter to enter fully into the bore of the gun. When the breech is closed further motion is prevented by the last thread of the locking screw $E^2$ striking the first thread of the female screw in the breech of the gun. The breech is now locked by turning the handle E fully to the front when the full portion of the locking screw $E^2$ engages with the female thread in the breech of the gun. When fully locked further movement of the handle E is prevented by the face $f$ striking the stop $f^2$. As the handle turns to the front, the helical thread of the cocking cam I previously in engagement with the cocking toe $g'$, which it had driven outward in the process of cocking, is rotated away from it, leaving the spring box G locked and the hammer cocked, as already described; so that when the handle is fully turned and the block locked, the unthreaded or plain surface of the axis of the cam I registers with the cocking toe leaving the latter free to move inward under the impetus of the spring, when the spring box is unlocked. The mechanism is now as shown in Fig. 4. The lanyard hook is now inserted in the eye R and the gun is ready for firing. Pulling the lanyard the trigger piece is caused to revolve, freeing the sear $o^2$ from the cocking notch $g'$, the spring box G flies inward under the impulse of the main spring, the outward tooth of the rack $G'$ acting on the tooth $j^2$ causes the hammer J to revolve about its axis, and the firing pin passing through the hole in the bushing of the firing plate strikes the primer of the cartridge firing the gun.

To dismount the mechanism proceed as follows: Turn the handle E to a nearly vertical position when the passage $f^3$ will register with the cylindrical chamber $g$. A screw driver is now engaged in the slot formed in the head $O'$ of the trigger shaft and the latter turned until the bayonet joint formed by the shoulder $o^3$ and the groove $o^4$ is unlocked. The trigger and with it the main spring may now be removed. The handle E with its shaft are now free and may be withdrawn. The locking screw and cocking cam are now free and may be removed. Passing the finger under the tail $j^3$ of the hammer the latter may be removed, and finally the spring box, which is now free. To remove the breech block, unscrew the stop bolt and pull out the block and finally remove the extractor which is now free. The breech block and mechanism are mounted in the reverse order, but it is evident that the percussion mechanism may be completely mounted and dismounted with the breech block either in or out of the gun.

Having now fully described our invention, what we claim is—

1. In a breech loading gun closed by a breech block moving essentially at right angles to the bore, the combination with the breech block having suitable recesses, of a locking screw, a cam integral with said locking screw and consisting of a helical thread making a partial revolution around the extended axis thereof, a spring actuated percussion mechanism, and suitable intermediate devices operatively connected to the spring of the percussion mechanism and arranged to be acted upon by the cam, all contained and moving with said block, whereby when the block is unlocked, the said percussion mechanism is cocked, substantially as described.

2. In a breech loading gun closed by a breech block moving essentially at right angles to the bore and having a locking screw mounted on the breech block, the combination with the locking screw of a helically threaded cam located in the breech block and forming an extension of the axis of the locking screw, and integral therewith a helical spring located in a chamber in said breech block parallel to the axis of said cam, and suitable intermediate devices arranged to be acted upon by said cam and operatively connected to said spring, all contained within and moving with said block whereby when said locking screw is unlocked said spring is compressed, substantially as described.

3. In a breech loading gun closed by a breech block moving essentially at right angles to the bore and having a locking screw mounted in the block and a hammer journaled in a suitable recess in the block, the combination with the locking screw of a helically threaded cocking cam located in the breech block forming an extension of the axis of the locking screw and integral therewith, a helical spring located in a chamber in said breech block parallel to the axis of said cam, suitable intermediate devices arranged to be acted upon by said cam and operatively connected to said spring and suitable connecting mechanism between said spring and said hammer all contained within and movable with said block, whereby when said locking screw is unlocked said spring is compressed and the hammer is cocked, substantially as described.

4. In a breech loading gun closed by a breech block moving essentially at right angles to the bore and having a locking screw mounted in the block, the combination with the locking screw of a helically threaded cocking cam located in the breech block forming an extension of the axis of the locking screw and integral therewith, said cocking cam having a surface partially helically threaded and partially at right angles to its axis, a spring box located in a chamber in said breech block parallel to the axis of said cam, adapted to move longitudinally in said chamber, and having a laterally projecting lug which engages with said cam surface through a longitudinal slot in said chamber wall, and a helical spring located in said spring box, having one end abutting against the bottom of said spring box and the other against a bearing in said chamber, all contained within and moving with said block whereby when said locking screw is unlocked, said spring is compressed, substantially as described.

5. In a breech loading gun closed by a breech block moving essentially at right angles to the bore and having a locking screw mounted in the block and a hammer journaled in a suitable recess in the block, the combination with the locking screw of a helically threaded cocking cam located in the breech block forming an extension of the axis of the locking screw and integral therewith, said cocking cam having a surface partially helical and partially at right angles to its axis, a spring box located in a chamber in said breech block parallel to the axis of said cam, adapted to move longitudinally in said chamber and having a laterally projecting lug which engages with said cam surface through a longitudinal slot in said chamber wall, a hammer having a shaft journaled in a suitable recess in said breech block, said shaft being at right angles to said spring box, one or more teeth upon said shaft, two or more teeth upon said spring box in engagement with the teeth upon said shaft, and a helical spring located in said spring box having one end abutting against the bottom of said box and the other against a bearing in said chamber, all contained within and moving with said block whereby when said locking screw is unlocked, said hammer is cocked, substantially as described.

6. In a breech loading gun closed by a breech block moving essentially at right angles to the bore and having a locking screw mounted in the block, the combination with the hammer journaled in a suitable recess in the block, of the hammer shaft, a tooth upon said shaft, a spring box located in a chamber in said breech block at right angles to the shaft and adapted to move longitudinally therein, one or more teeth upon said spring box confining between them the single tooth upon said shaft, a helical spring located in said spring box and abutting as described, and a device mounted upon the block which imparts a longitudinal movement to said spring box against the stress of the spring, all of said parts being movable with said block whereby the hammer is cocked, substantially as described.

7. In a breech loading gun closed by a breech block moving essentially at right angles to the bore, the combination with a spring box, located in a chamber in said breech block, and adapted to move longitudinally therein, and having a section of its wall removed and a sear notch thereon of a helical spring located in said chamber and having one end abutting against the bottom of said spring box and the other against a bearing in said chamber, and a rotating trigger shaft, removably and rotatably secured to the breech block and passing axially through said helical spring and spring box, and having a sear adapted to register and to lock with said sear notch on the spring box, when said spring is compressed and the trigger rotated, substantially as described.

8. In a breech loading gun closed by a breech block moving essentially at right angles to the bore the combination with a spring box located in a chamber in said breech block and adapted to move longitudinally therein, and having a section of its wall removed and a sear notch therein, of a helical spring located in said chamber and having one end abutting against the bottom of said spring box, a rotating trigger having a head removably and rotatably secured to the breech block and a shaft passing axially through said helical spring and spring box, a shoulder on said trigger shaft forming an abutment for the other end of said spring, a sear on said shaft adapted to register and lock with said sear notch on the spring box, when the spring is compressed and the trigger rotated, an eccentric lug upon the trigger head, a hook upon the gun breech forming a closed eye with the trigger head lug, when the spring is compressed and the sear locked, and a device for opening the eye to release the spring, substantially as described.

9. In a breech loading gun closed by a breech block moving essentially at right angles to the bore and having a locking screw mounted in the block and a hammer journaled in a suitable recess in the block, the combination of the locking screw, the helical cam located in the breech block forming an extension of the axis of the locking screw and integral therewith having a surface partially helical and partially at right angles to its axis, a spring box located in a chamber in said breech block parallel to the axis of said cam adapted to move longitudinally in said chamber and having a laterally projecting lug which engages with said cam surface through a longitudinal slot in said chamber wall, a hammer having a shaft journaled in a suitable recess in said breech block at right angles to said spring box, one or more teeth upon said shaft, two or more teeth upon said spring box in engagement with the teeth upon said shaft, a helical spring located in said spring box and having one end abutting against the bottom of said box, a rotating trigger having a head removably and rotatably secured to the breech block and a shaft passing axially through said helical spring and spring box, a shoulder on said trigger shaft forming an abutment for the other end of said spring, a sear on said trigger shaft, a sear notch on said spring box adapted to register and lock with said trigger shaft sear, when the spring is compressed and the trigger rotated, an eccentric lug upon the trigger head, a hook upon the gun breech forming a closed eye with the trigger head lug when the spring is compressed and the sear locked and a device for opening the eye to release the spring, substantially as described.

10. In a breech loading gun closed by a breech block moving essentially at right angles to the bore, the combination with a removable locking screw and helical cam integral therewith, consisting of a helical thread making part of a complete revolution around the prolonged axis of the locking screw located in the breech block of a handle and shaft removably secured to the locking screw, substantially as described.

11. In a breech loading gun closed by a breech block moving essentially at right angles to the bore, and having the within described spring compressing mechanism, the combination with a removable locking screw having a spring actuating cam integral therewith, consisting of a helical thread making part of a complete revolution around the prolonged axis of the locking screw a cylindrical axial chamber and a key way in said chamber, of a removable handle having a shaft journaled in said breech block and locking screw and having a key on the shaft which engages the keyway on the locking screw, a disk shaped head on the shaft handle rotating therewith and having a recessed guide way on its under surface next to the breech block, and a stop on the breech block, engaging in said guide way, substantially as described.

12. In a breech loading gun closed by a breech block moving essentially at right angles to the bore, and having the within described spring actuated percussion mechanism, the combination with the removable handle journaled in the breech block as described, and the disk shaped head rotating therewith and having a circular notch in its periphery, of the removable trigger shaft mounted in the breech block adjacent to and parallel with the handle, having a rotatable bayonet joint adapted to lock with the breech block below said handle disk, and a head adapted to bear against the outer surface of said handle disk and retain it in place against the breech block when the trigger shaft is locked, substantially as described.

13. In a breech loading gun closed by a breech block moving essentially at right angles to the bore and having the within described spring actuated mechanism, the combination with the spring box having the sear notch, its contained spring, and rotatable trigger shaft with its sear all located as described of the annular trigger shaft shoulder $o^3$ having the face $o^6$ and the handle and shaft rotatably mounted on the block, having the disk with the recess F' and abutment $f'$ on its under periphery, which engages with said trigger face $o^6$ to rotate the trigger when the handle is turned, substantially as described.

14. The combination with the breech block A having the chambers K and K' and the recessed bearings $k'$ and their entrances $k^2$ for introducing and mounting the hammer and its shaft, of the removable hammer J and its shaft $j'$ having the extremities of reduced diameter and cut away to pass through the entrance $k^2$ and fit into the bearing $k'$ in the breech block, substantially as described.

15. The combination with the breech block A having the chambers K K' the recessed bearings $k'$ and their entrances $k^2$ for introducing and mounting the hammer and its shaft, of the removable hammer J and its shaft $j'$ constructed as described to fit into the chambers and bearings in the breech block, and the tail $j^3$ on the hammer shaft for removing the hammer, substantially as described.

16. The combination with the breech block A having the chambers K K', the recessed bearings $k'$ and their entrances $k^2$ for introducing and mounting the hammer and its shaft, and the screw threaded firing plate seat L, of the removable hammer J and its shaft $j'$ constructed as described to fit into the breech block, the removable screw threaded firing plate M, having the removable bushing N and wrench holes $m$ $m$, and the tail $j^3$ on the hammer shaft, substantially as described.

In testimony whereof we have hereunto set our hands in the presence of two subscribing witnesses.

LAURENCE V. BENÉT.
HENRI A. MERCIÉ.

Witnesses:
ALFRED C. VREMEY,
CHARLES KREMER.